(12) United States Patent
Mahadevaiah

(10) Patent No.: US 10,138,612 B2
(45) Date of Patent: Nov. 27, 2018

(54) STATIONARY BOOM SUPPORT SYSTEM

(71) Applicant: Basavaraj Mahadevaiah, Alpharetta, GA (US)

(72) Inventor: Basavaraj Mahadevaiah, Alpharetta, GA (US)

(*) Notice: Subject to any disclaimer, the term of this patent is extended or adjusted under 35 U.S.C. 154(b) by 127 days.

(21) Appl. No.: 14/850,121

(22) Filed: Sep. 10, 2015

(65) Prior Publication Data

US 2015/0376853 A1 Dec. 31, 2015

Related U.S. Application Data

(63) Continuation of application No. 14/132,997, filed on Dec. 18, 2013, now Pat. No. 9,133,593, which is a continuation-in-part of application No. 13/188,150, filed on Jul. 21, 2011, now abandoned.

(60) Provisional application No. 61/367,245, filed on Jul. 23, 2010.

(51) Int. Cl.
*E02B 15/06* (2006.01)
*E02B 15/08* (2006.01)
*E02B 15/10* (2006.01)
*E03B 3/04* (2006.01)
*E02B 15/04* (2006.01)

(52) U.S. Cl.
CPC ............ *E02B 15/06* (2013.01); *E02B 15/045* (2013.01); *E02B 15/047* (2013.01); *E02B 15/048* (2013.01); *E02B 15/085* (2013.01); *E02B 15/0828* (2013.01); *E02B 15/0835* (2013.01); *E02B 15/104* (2013.01); *E03B 3/04* (2013.01); *Y02A 20/204* (2018.01)

(58) Field of Classification Search
CPC ......... E02B 15/104; E02B 15/06; E02B 15/04
See application file for complete search history.

(56) References Cited

U.S. PATENT DOCUMENTS

| | | | | |
|---|---|---|---|---|
| 3,990,975 A | * | 11/1976 | McLellan | E02B 15/101 210/242.4 |
| 4,052,313 A | * | 10/1977 | Rolls | E02B 15/101 210/242.3 |
| 4,349,439 A | * | 9/1982 | Lundin | E02B 15/101 210/242.3 |
| 4,356,089 A | * | 10/1982 | Challener | C02F 1/681 210/242.4 |
| 4,377,478 A | * | 3/1983 | Rolls | E02B 15/101 210/242.3 |

(Continued)

*Primary Examiner* — Jessica H Lutz
(74) *Attorney, Agent, or Firm* — Bryan W. Bockhop; Bockhop Intellectual Property Law, LLC

(57) ABSTRACT

A containment boom system for remediating an oil spill in a body of water includes a base support structure and a containment boom. An elongated rod has a proximal end and a spaced apart distal end. The proximal end is hingedly attached to the base support structure and extends laterally therefrom. A buoy is coupled to the distal end of the elongated rod. The buoy has sufficient buoyancy so as to remain floating on the liquid body while supporting the elongated rod. A reclamation loop is disposed in the water, a first portion of which is disposed in the oil spill and a second portion is disposed the water on the opposite side of the containment boom from the oil spill. The reclamation loop is continuously driven through a reclamation station, which removes oil therefrom.

5 Claims, 7 Drawing Sheets

(56) References Cited

U.S. PATENT DOCUMENTS

| | | | | |
|---|---|---|---|---|
| 5,051,029 A | * | 9/1991 | Ecker | E02B 15/08 |
| | | | | 405/66 |
| 5,102,540 A | * | 4/1992 | Conradi | E02B 15/046 |
| | | | | 210/232 |
| 5,217,611 A | * | 6/1993 | Ayroldi | E02B 15/103 |
| | | | | 210/242.1 |
| 5,227,072 A | * | 7/1993 | Brinkley | B01D 17/00 |
| | | | | 210/671 |
| 2009/0123233 A1 | * | 5/2009 | Herzogenrath | B63B 21/02 |
| | | | | 405/70 |

* cited by examiner

STATIONARY BOOM SUPPORT SYSTEM

CROSS-REFERENCE TO RELATED APPLICATION(S)

This application is a continuation of U.S. patent application Ser. No. 14/132,997, filed on Feb. 18, 2013 and issued as U.S. Pat. No. 9,133,593 on Sep. 15, 2015, which is a continuation-in-part of U.S. patent application Ser. No. 13/188,150, filed Jul. 21, 2011 (now abandoned), which was a non-provisional application of U.S. Provisional Patent Application Ser. No. 61/367,245, filed Jul. 23, 2010. This application claims the benefit of each of these applications and each of these applications is hereby incorporated herein by reference.

BACKGROUND OF THE INVENTION

1. Field of the Invention

The present invention relates to containment boom systems and, more specifically, to a containment boom system that is maintained at a distance relative to a fixed point.

2. Background

Oil and chemical spills on surface waters originate from two primary sources—releases from sources in surface water and seepage from shoreline. Releases from sources such as pipelines, ships or other vessels and structures in surface water is an acute condition demanding rapid recovery of large volumes of release. Ineffective recovery results in oil contamination along the shoreline. Seepage from shoreline results in a chronic condition due to gradual migration of releases from storage and conveyance facilities located on the shores. Oil blooms from such seeps contaminate surface waters. Both sources not only present a safety hazard but also pose serious environmental threats to the fragile marine ecosystems vital to local economies.

The current state of the art is to use containment booms and in some instances absorbent booms as well to address the release. Containment booms are used to keep surface oil spills and the like from entering protected areas. Typical booms include a plastic sleeve with a tubular flotation structure running along the length of the sleeve. A weighted structure causes a portion of the sleeve to form a vertical wall that acts as a barricade to the oil spill. Current booms tend to contain the product for only a short time frame before the oil dissipates or seeps past the boom. Containment booms are only capable of containing the release until the waves gradually breach the containment. Upon reaching saturation from oil absorption, the absorbent booms become ineffective presenting a very limited capacity to capture the oil. Eventually, the oil dissipates or seeps past the boom and absorbent booms.

Also, bottom anchors that hold the boom in place can damage the coral reefs on which they rest. As the anchors move with wave action, the tether that connects the anchor to the boom breaks apart. The booms would then be hurled back on to the shores or strung out into the ocean rendering them ineffective. When the booms get washed ashore, rocks and other structures on the shore damage the booms resulting in expensive repairs and replacement costs. In some instances, divers have to tread oily waters to anchor the booms leading to safety hazards.

Consequently, these remedies only serve as temporary solutions resulting in perpetual and escalating costs. Combating oil releases in surface waters is a serious challenge. Therefore, there is a need to invent a method that eliminates bottom anchors and actively recovers the oil along the boom providing effective containment.

Therefore, there is a need for a stationary boom system that does not require bottom anchors or unanchored free floating systems.

SUMMARY OF THE INVENTION

The disadvantages of the prior art are overcome by the present invention which, in one aspect, is a containment boom system for use in a liquid body that includes a base support structure and a containment boom. An elongated rod has a proximal end and a spaced apart distal end. The proximal end is hingedly attached to the base support structure and extends laterally therefrom. A buoy is coupled to the containment boom and is coupled to the distal end of the elongated rod. The buoy has sufficient buoyancy so as to remain floating on the liquid body while supporting the elongated rod.

In another aspect, the invention is a reclamation system for use in a body of water on which is disposed an oil spill. At least one elongated rod has a proximal end and a spaced apart distal end. The proximal end is hingedly attached to a base support structure and extends laterally therefrom. The distal end is supported by a buoy. A first containment boom has a first end secured to a first location and an second end secured to a spaced apart second location. The first containment boom is laterally supported by the at least one elongated rod so that the first containment boom separates a portion of the body of water from the oil spill. A reclamation loop is disposed on a selected side of the first containment boom so that a portion of the reclamation loop is in contact with the oil spill. The reclamation loop includes a material that absorbs oil and that does not absorb water. The reclamation loop is mounted on at least one wheel that allows lateral movement of the reclamation loop. A loop driver is configured to cause the reclamation loop to move laterally in a continuous loop. A reclamation station is coupled to the reclamation loop and is configured to extract oil from the reclamation loop as the loop passes therethrough, thereby reclaiming oil therefrom.

In yet another aspect, the invention is a method of providing lateral support to a containment boom, in which the containment boom is coupled to a buoy. A proximal end of an elongated rod is hingedly attached to a base support structure. A distal end of the elongated rod is hingedly attached to the buoy. The base support structure is coupled to a predetermined location.

In yet another aspect, the invention is a containment boom system for use in containing an oil spill floating on a water surface. At least one elongated rod has a proximal end and a spaced apart distal end. The proximal end is hingedly attached to a base support structure and extends laterally therefrom. An inner containment boom is coupled to the at least one elongated rod. A buoy is coupled to the at least one elongated rod. The buoy has sufficient buoyancy so as to remain floating on the water surface while supporting the elongated rod. A second containment boom is spaced apart from the first containment boom and is coupled to the at least one elongated rod. The second containment boom is disposed so that the first containment boom and the second containment boom define a channel in the water surface therebetween. The first containment boom and the second containment boom are positioned so that the oil spill is adjacent to a selected one of the first containment boom and the second containment boom, and so that the oil spill is outside of the channel. A continuous rotatable reclamation loop is supported by a structure coupled to the at least one elongated rod. The reclamation loop includes a hydrophobic material that is configured to adsorb the oil and that is configured not to absorb water. The continuous rotatable reclamation loop includes a first portion that is disposed in the oil spill and a second portion that is disposed on the water surface in the channel. A reclamation station is configured to remove oil from the reclamation loop as the loop passes therethrough. A loop driver is configured to move the rotatable reclamation loop through the oil spill into the reclamation station and from the reclamation station into the channel.

In yet another aspect, the invention is a method of reclaiming an oil spill in a body of water, in which at least one elongated rod is supported with a buoy that is floating in the water. A proximal end of the elongated rod is hingedly attached to a base support structure. An inner boom is affixed to the at least one elongated rod. An outer boom is affixed to the at least one elongated rod. The inner boom and the outer boom define a channel in the water therebetween and wherein the oil spill is disposed at a location that is a selected one of outside of the outer boom or inside of the inner boom. A continuous rotatable reclamation loop includes a hydrophobic material configured to adsorb oil from the oil spill and configured not to absorb water. The reclamation loop is placed so that a first portion of the reclamation loop is disposed in the oil spill and so that a second portion of the reclamation loop is disposed in the water in the channel. The reclamation loop is supported by structures coupled to the at least one elongated rod. The reclamation loop is driven continuously so as to move the reclamation loop through the oil spill into a reclamation station. Oil is removed from the reclamation loop at the reclamation station as the loop passes therethrough.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
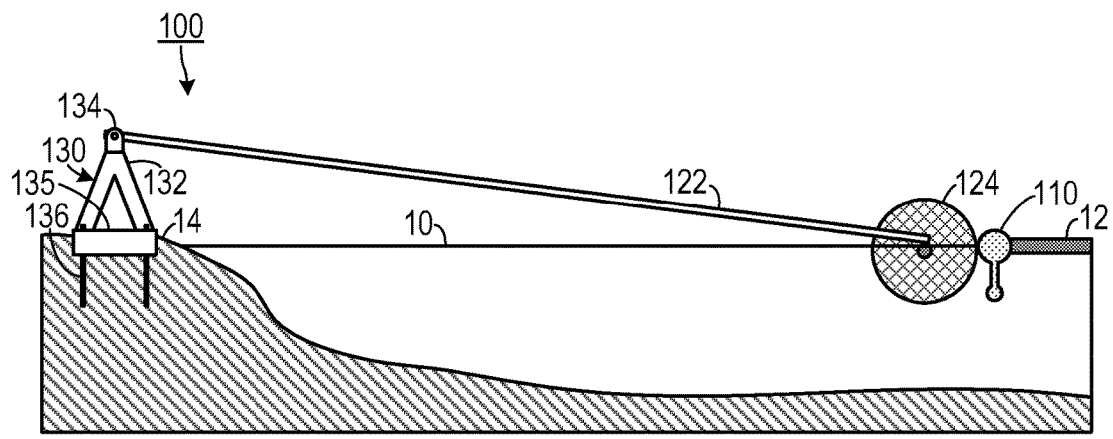
FIG. 1 is an elevational view of a shore-based boom system.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 2:
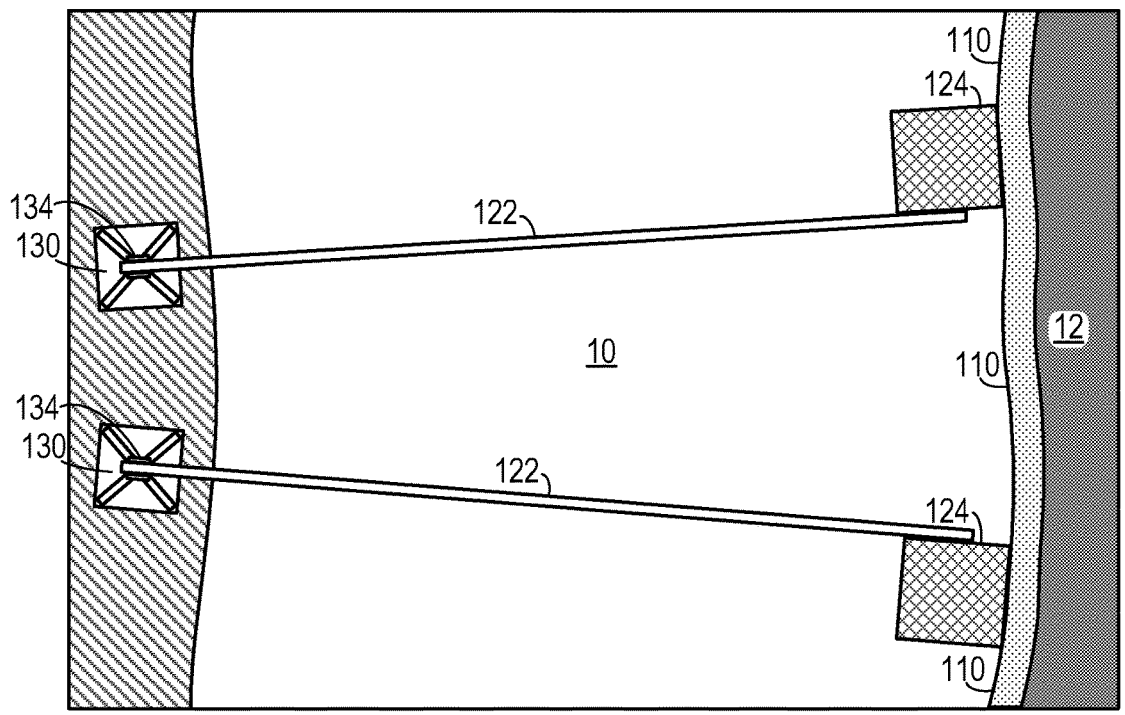
FIG. 2 is a top plan view of the shore-based boom system shown in FIG. 1.

As shown in FIGS. 1 and 2, one embodiment of a containment boom system 100 includes an elongated rod 122 that is coupled at a proximal end to a shore-base support system 130 and that is coupled at a distal end to a boom support buoy 124 and a containment boom 110, both of which are disposed in a body of water 10. Typically, the containment boom 110 is used to restrict movement of an oil slick 12, or other such contaminant. The boom support buoy 124 is selected to have sufficient buoyancy to support the elongated rod 122.

In one embodiment, the elongated rod 122 can include a metal conduit (e.g., steel conduit or aluminum conduit). In a smaller embodiment, the elongated rod 122 could include other materials, such as PVC pipe. In other embodiments, the rod 122 can include wood, plastics, polymers, fiberglass, composites, or any other material from which rods can be made. In one embodiment, the support buoy could be made of a steel drum, such as a 55 gallon steel drum.

The shore-base support system 130 includes a base support structure 132 that is secured to the ground 14. In some embodiments, the support structure 132 is held in place on a ground surface 14 with an anchoring system that may include a plurality of anchoring rods 136 or is secured to a concrete pad 135, or both. Alternately, the support structure 132 may be affixed to a stationary object, such as a pier. A hinge 134 is used to secure the proximal end of the elongated rod 122 to the support structure 132. The hinge 134 allows vertical movement of the distal end of the elongated rod 122, but restricts lateral movement of the distal end of the elongated rod 122.

In one embodiment, the elongated rod 122 is hollow to transport oil from the oil slick 12, recovered with a remediation system, to a shore-based tank (not shown). In another embodiment, the elongated rod 122 supports a separate hose (not shown) for transporting oil.

Figure 3:
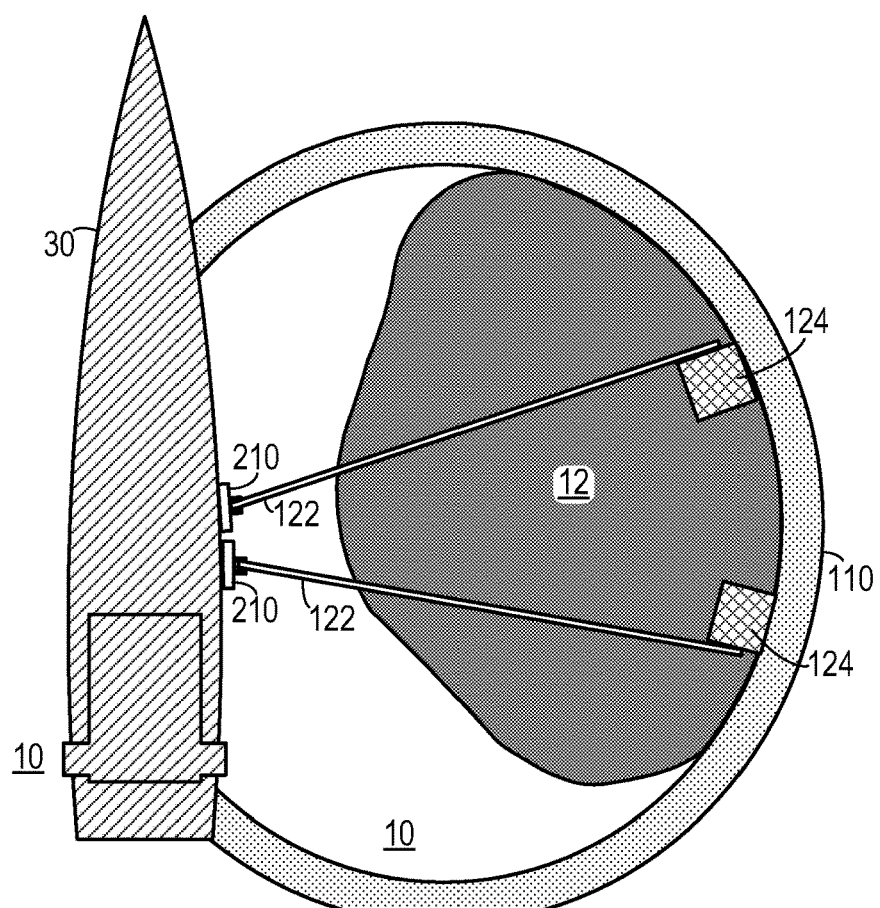
FIG. 3 is an elevational view of a ship-based boom system.
Figure 4:
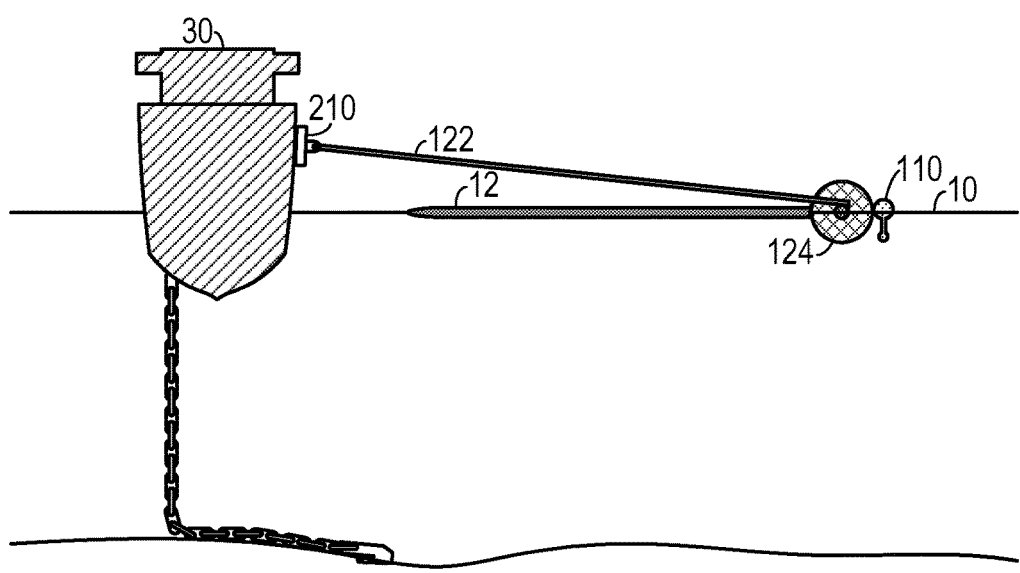
FIG. 4 is a top plan view of the ship-based boom system shown in FIG. 3.

As shown in FIGS. 3 and 4, the boom system can be attached to a vessel such as a ship 30, a barge, an oil drilling platform or the like, for containing local spills. Such a system includes a mounting structure 210 for coupling the elongated rod 122 to the hull of the ship 30 (which typically includes a ferrous vertical wall). In one embodiment, the mounting structure 210 can be affixed to the ship 30 with a magnet disposed in the mounting structure 210. In another embodiment, the mounting structure can be welded to the ship.

Figure 5:
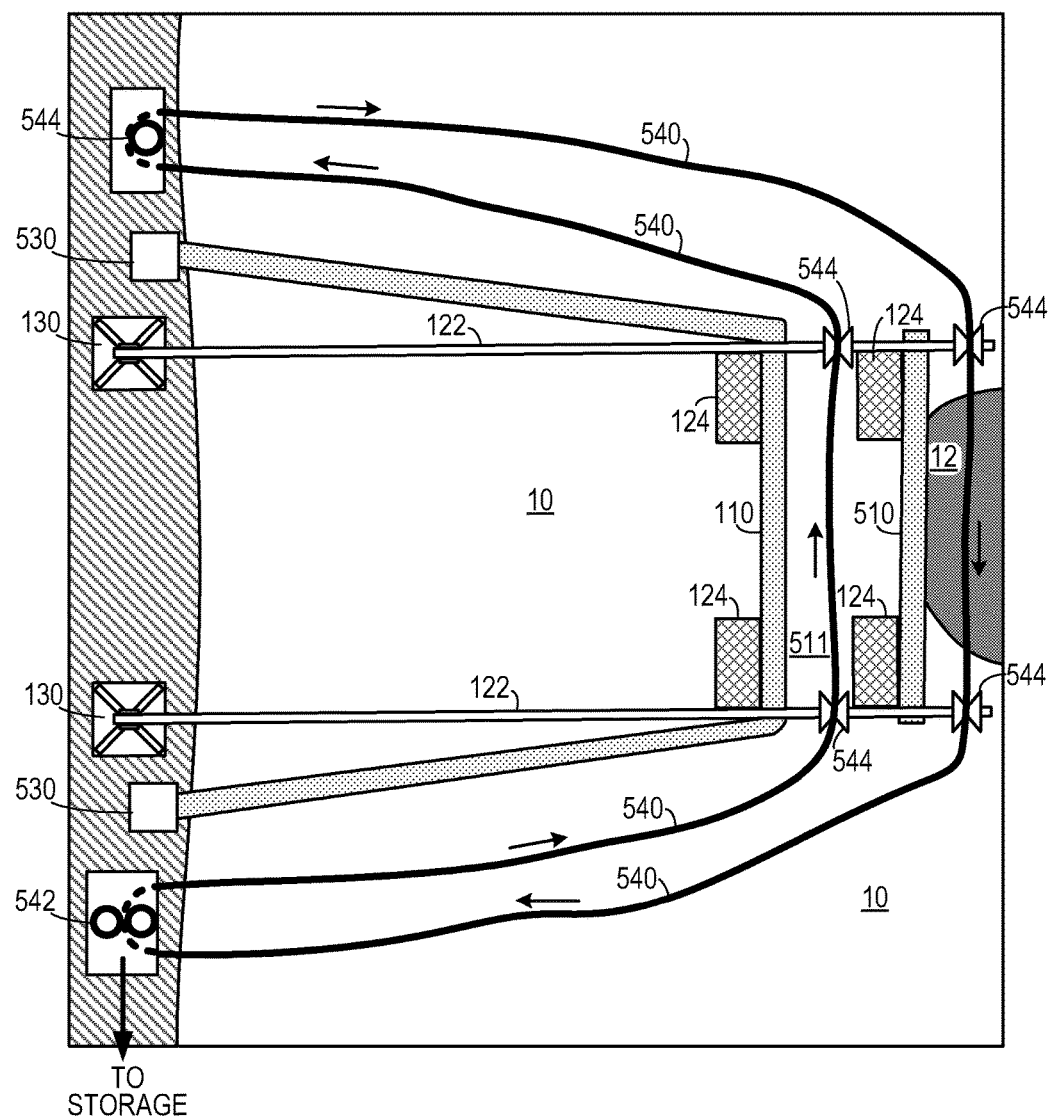
FIG. 5 is a top plan view of an active remediation system.
Figure 6A:
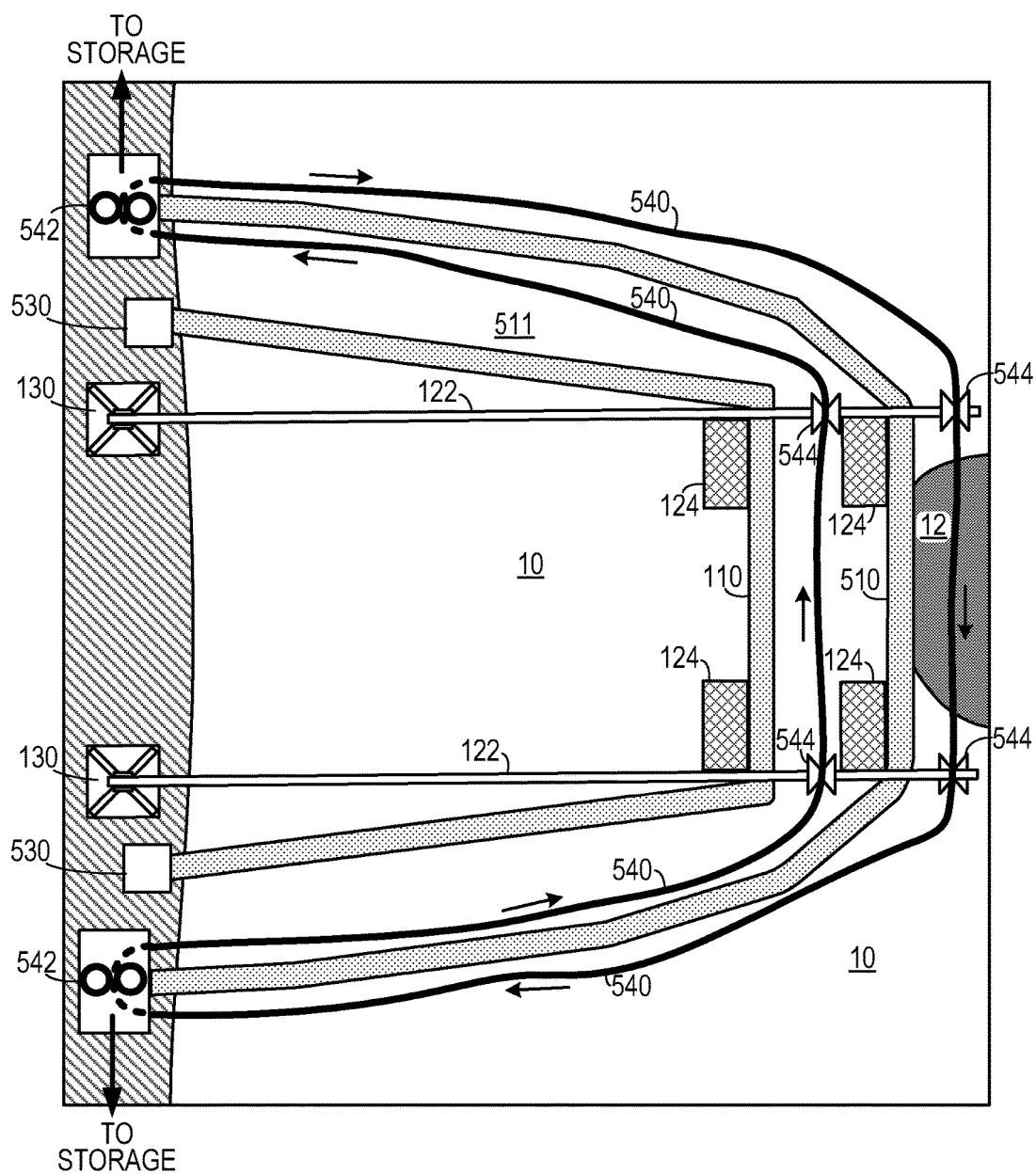
FIG. 6A is a top plan view of an active remediation system that includes two boom systems that each extend to a shoreline in which an oil spill is contained outside of an outer boom.
Figure 6B:
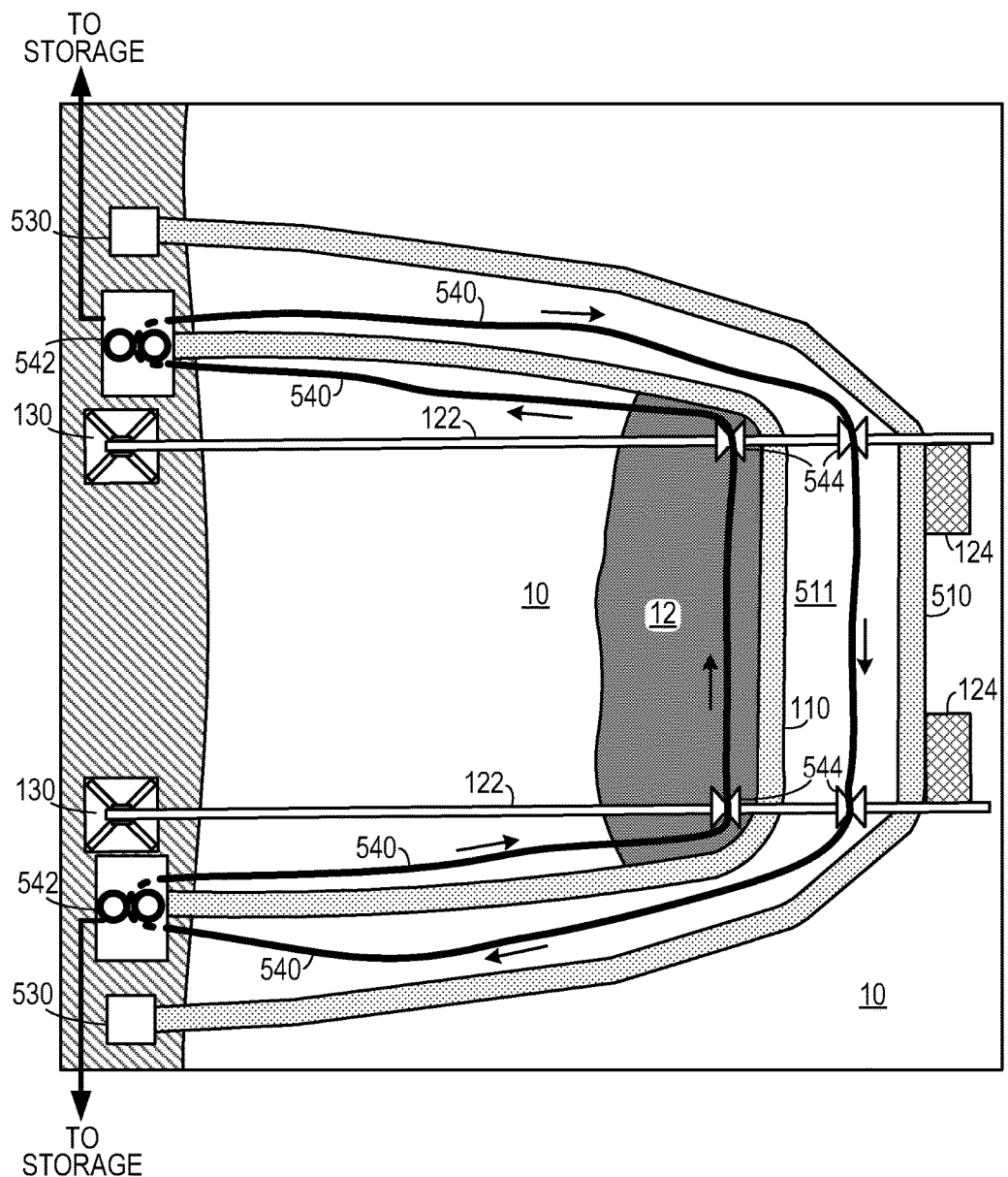
FIG. 6B is a top plan view of an active remediation system that includes two boom systems that each extend to a shoreline in which an oil spill is contained inside of an inner boom.

As shown in FIGS. 5, 6A and 6B, the boom system can be used with an active reclamation system. In this embodiment, a second outer boom 510 is spaced apart from the primary inner boom 110 and is supported by the rods 122. The inner boom 110 and the outer boom 510 are made from a non-rigid material and define a channel 511 between the two booms. The inner boom 110 extends to the shore, where it is anchored with a pair of securing anchor members 530. A reclamation loop 540, which in one embodiment could include a line with oleophilic and hydrophobic bristles extending radially therefrom, is placed in the water 10 so that an inner portion of the loop 540 is between the inner boom 110 and the outer boom 510 and so that an outer portion of the loop 540 is placed outside of the outer boom 510 into the spill 12. The loop 510 rotates over a plurality of pulley wheels 544 (which could include a pair of concave wheels that are arranged so as to trap the reclamation loop 540 therebetween) in the direction of the arrows into reclamation stations 542, where oil is reclaimed. One type of remediation system that can be employed in this embodiment is disclosed in U.S. Pat. No. 6,659,176, which is incorporated herein by reference. As shown in FIG. 5, a single reclamation station 542 can be employed or, as shown in FIGS. 6A and 6B, two reclamation stations 542 disposed at opposite ends of the reclamation loop 540 can be used. In the embodiment shown in FIG. 6A, the oil spill 12 is contained outside of the outer boom 510, whereas the oil spill 12 is contained inside of the inner boom 110 in the embodiment shown in FIG. 6B. In one embodiment, the support system 130 could include a shore based structure that is anchored to the ground of the type disclosed in FIG. 1 above. In an alternate embodiment, a heavy ferrous plate could be placed on the shore and a magnetic mounting plate (of a type that will be discussed in more detail below with reference to FIG. 8) can be coupled to the heavy ferrous plate. In one embodiment, the support structure 130 can be affixed to a floating vessel, such as a ship, a boat or a barge. In such an embodiment, the support structure 130 can be permanently mounted to the vessel (for example, by welding it to the vessel or with bolts) or it may be temporarily mounted to the vessel (for example, by using a magnetic coupling or with an adhesive).

One embodiment includes two important elements—a stationary containment boom and active oil recovery along the boom. Fixing the boom position is accomplished with surface anchors and rigid connectors that render the boom geostationary. Active oil recovery can then be initiated within the boom using a hydrophobic fabric that is positioned along the boom or other methods. A multi-tiered boom consisting of two sets of stationary booms equipped with hydrophobic fabric can be utilized to increase the containment and recovery efficiency.

Figure 7A:
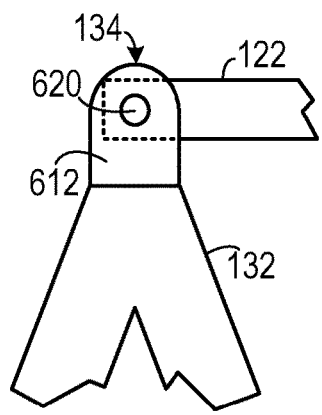
FIGS. 7A-7B are two views of a hinge.
Figure 7B:
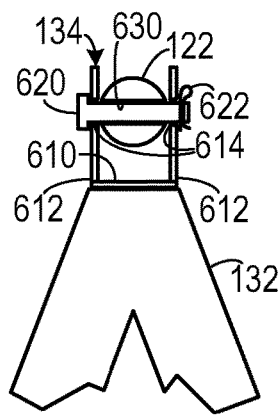

One example of a hinge 134 for coupling the elongated rod 122 to a support or mounting structure 132 is shown in FIGS. 7A and 7B. Two parallel plates 612 extend upwardly from a base plate 610 and each define a hole 614 passing therethrough. The two plates 612 are spaced apart at a distance sufficient to allow the elongated rod 122 to fit therebetween. The elongated rod 122 defines an opening 630 passing therethrough that is in alignment with the holes 614. A hinge pin 620 passes through the holes 614 and the opening 630 so as to hold the proximal end of the rod 122 is a vertically pivotal relationship with the vertical plates 612. A cotter pin 622 may be used to hold the hinge pin 620 in place.

Figure 8:
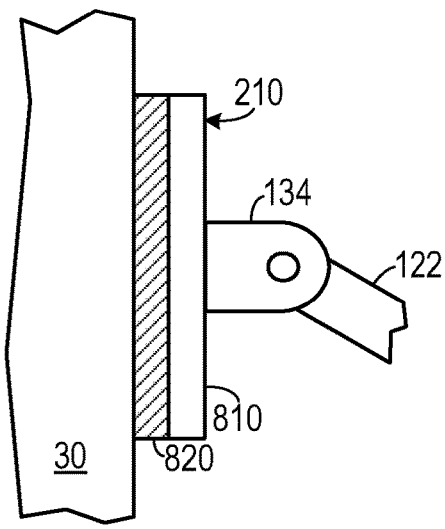
FIG. 8 is a side view of a structure for attaching a boom to a vertical ferrous wall.

As shown in FIG. 8, a mounting structure 210 for securing the hinge 134 to a vessel 30 with a ferrous hull wall includes a hinge mounting plate 810 to which the hinge 134 is secured and a magnet 820 that is coupled to the hinge mounting plate 810. The magnet 820 can be a permanent magnet or it can be an electromagnet powered, for example, from the vessel. In situations where the vessel 30 has a non-ferrous hull wall, the hinge mounting plate 810 can be secured to the hull wall with an adhesive or a suction unit (e.g., a suction cup that is continually evacuated with a vacuum pump).

The system disclosed herein can be configured either to prevent oil spills from reaching shoreline and water intakes or to contain oil seeps from entering surface waters.

Figure 9A:
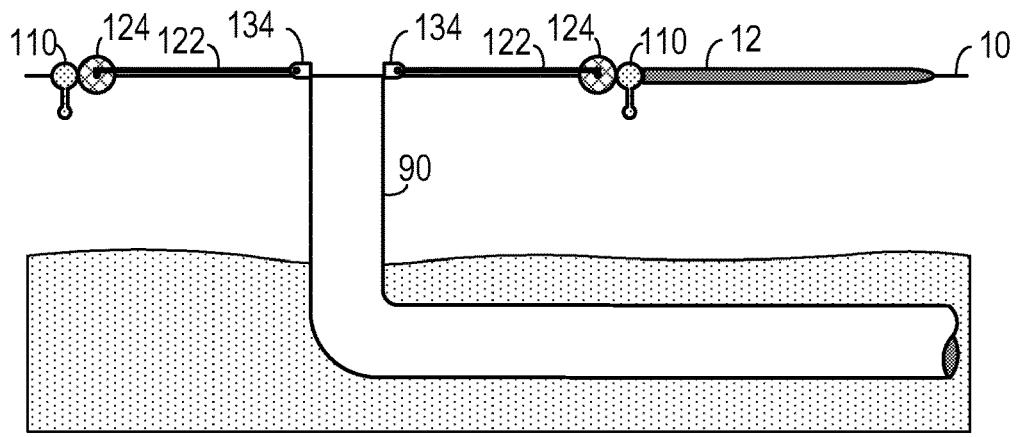
FIG. 9A is an elevational view of an embodiment used with a water intake system.
Figure 9B:
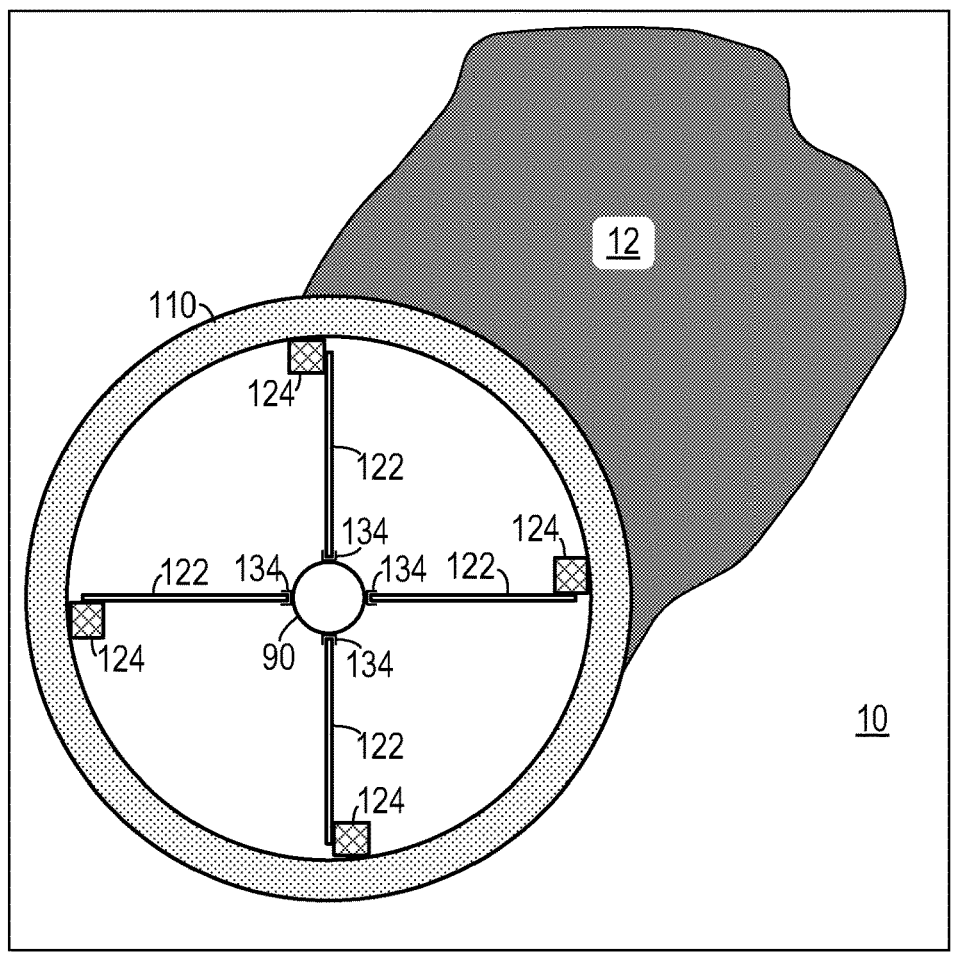
FIG. 9B is a plan view of the embodiment shown in FIG. 9A.

As shown in FIGS. 9A and 9B, one embodiment can be used to hold a containment boom 110 at a predetermined distance from a water inlet 90, such as an inlet to a water system from a river, a lake or a reservoir. While FIG. 9B shows four elongated rods 122 being used, more may be necessary if the boom 110 is subjected to a substantial amount of hydrodynamic pressure form, such as would be expected in a river. Also, a second containment boom (not shown) that is outside of and substantially concentric with the first containment boom 110 could be employed when using a remediation loop so that the return path of the remediation loop does not contaminate water flowing into the intake 90.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A containment boom system for use in containing an oil spill floating on a water surface, comprising:
   (a) a base support structure;
   (b) a first elongated rod, having a proximal end and a spaced apart distal end, the proximal end hingedly attached to the base support structure and extending laterally therefrom;
   (c) a containment boom, having a first side and an opposite second side, coupled to the first elongated rod and disposed in a portion of the water so that the oil spill is substantially contained by the first side of the containment boom;
   (d) a first buoy coupled to the first elongated rod, the buoy having sufficient buoyancy so as to remain floating on the water surface while supporting the first elongated rod;
   (e) a continuous rotatable reclamation loop including a hydrophobic material that adsorbs the oil and that does not to absorb water, the continuous rotatable reclamation loop including a first portion that is disposed on a first elongated side of the containment boom in the oil spill and a second portion that is disposed on the water surface on a second elongated side of the containment boom opposite from the first elongated side;
   (f) a first pulley wheel affixed to the first elongated rod and disposed on the first elongated side of the containment boom, the first pulley wheel supporting the first portion of the continuous rotatable reclamation loop;
   (g) a second pulley wheel affixed to the first elongated rod spaced apart from the first pulley wheel and disposed on a second elongated side of the containment boom opposite from the first side, the second pulley wheel supporting the second portion of the continuous rotatable reclamation loop;
   (h) a reclamation station configured to remove oil from the reclamation loop as the loop passes therethrough;

(i) a loop driver that is configured to move the rotatable reclamation loop through the oil spill into the reclamation station and from the reclamation station into the water that is on the second elongated side of the containment boom;

(j) a second elongated rod, having a proximal end and a spaced apart distal end, the proximal end hingedly attached to the base support structure and extending laterally therefrom, the second elongated rod being spaced apart from the first elongated rod, the second elongated rod coupled to the containment boom;

(k) a second buoy coupled to the second elongated rod, the buoy having sufficient buoyancy so as to remain floating on the water surface while supporting the second elongated rod;

(l) a third pulley wheel affixed to the second elongated rod and disposed on the first elongated side of the containment boom, the first portion of the continuous reclamation loop being supported thereby; and (m) a fourth pulley wheel affixed to the second elongated rod and spaced apart from the third pulley wheel and disposed on the second elongated side of the containment boom opposite from the first side, the second portion of the continuous reclamation loop being supported thereby.

2. The containment boom system of claim 1, wherein the base support structure is configured to maintain the containment boom at a distance from a fixed location, wherein the base support structure comprises:

(a) a support platform secured to the fixed location;

(b) a support structure, having a top, extending upwardly from the support platform; and (c) a hinge affixed to the top of the support structure and coupled to the proximal end of the elongated rod.

3. The containment boom system of claim 2, wherein the fixed location includes a ground surface and further comprising at least one anchoring rod driven into the ground surface so as to secure the support platform to the ground surface.

4. The containment boom system of claim 2, wherein the distal proximal end of the elongated rod defines an opening passing therethrough and wherein the hinge comprises:

(a) two vertical parallel plates extending upwardly from the top of the support structure, each parallel plate defining a hole passing therethrough, the two vertical parallel plates spaced apart at a distance sufficient to allow the proximal end of the elongated rod to be placed therebetween; and (b) a pin configured to pass through the holes defined by the vertical plates and the opening defined by the proximal end of the elongated rod so as to hold the proximal end of the elongated rod in a vertically pivotal relationship with the support structure.

5. The containment boom system of claim 1, wherein the base support structure is configured to maintain the containment boom at a distance from a ferrous metal structure, wherein the base support structure comprises:

(a) a support platform having a first side and an opposite second side;

(b) a magnet affixed to the first side of the support platform and configured to hold the support platform against the ferrous metal structure; and (c) a hinge affixed to the support platform configured to be coupled to the proximal end of the elongated rod.

* * * * *